No. 877,177. PATENTED JAN. 21, 1908.
H. D'OLIER, Jr.
ELECTRIC HEATER.
APPLICATION FILED JAN. 13, 1906.
3 SHEETS—SHEET 1.
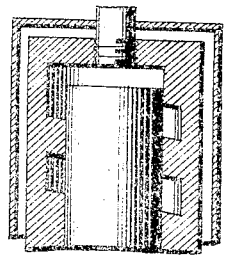
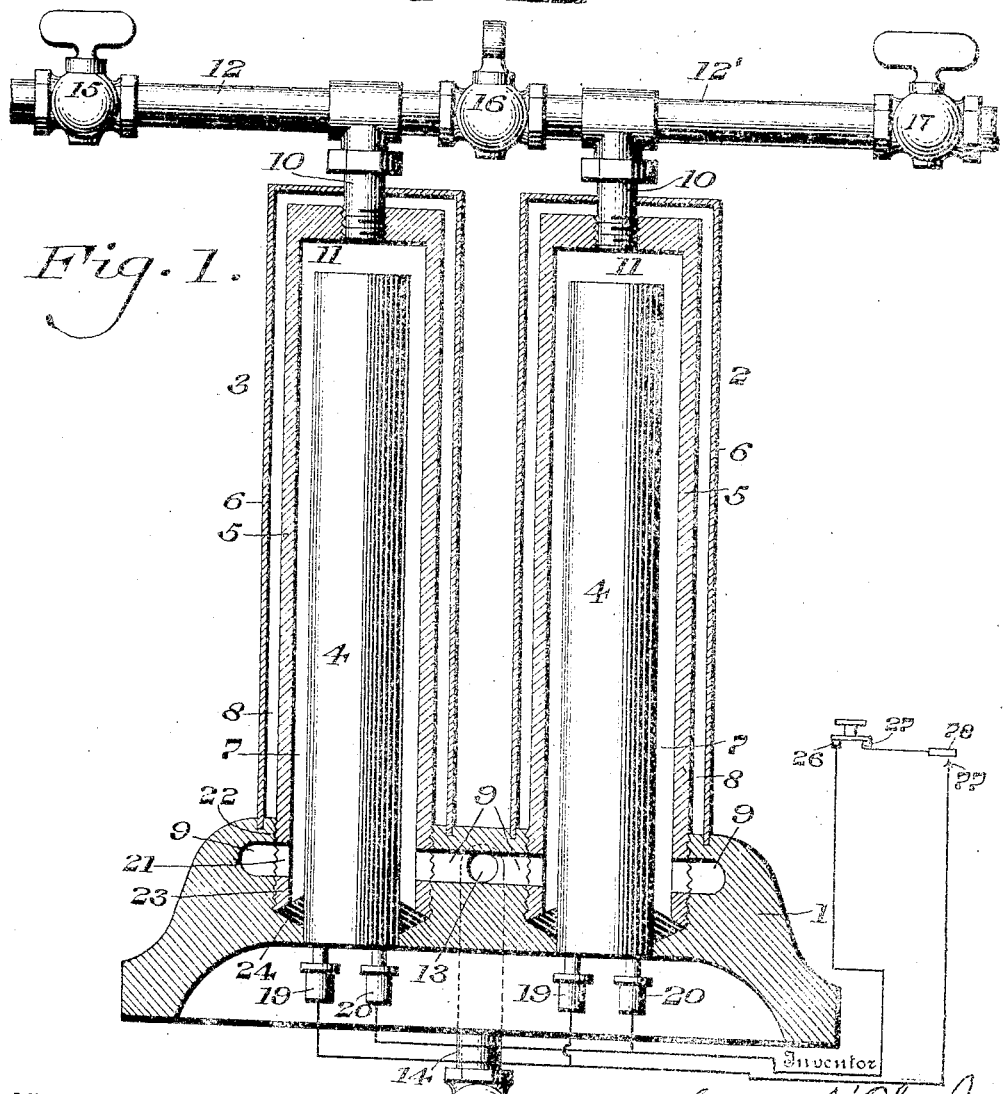

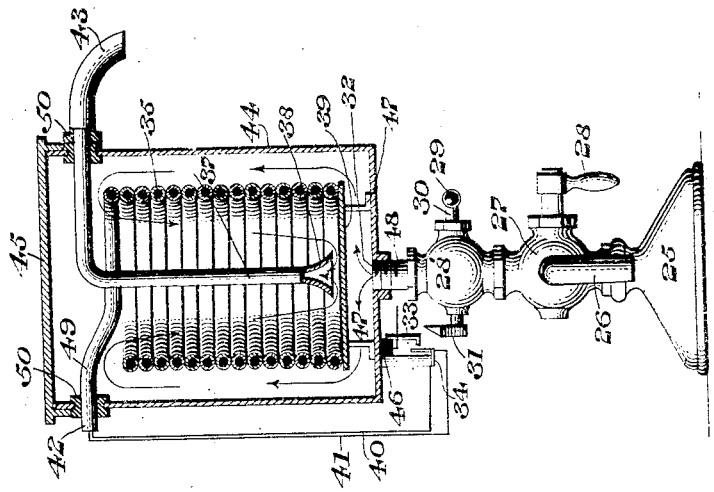

No. 877,177. PATENTED JAN. 21, 1908.
H. D'OLIER, JR.
ELECTRIC HEATER.
APPLICATION FILED JAN. 13, 1906.
3 SHEETS—SHEET 3.
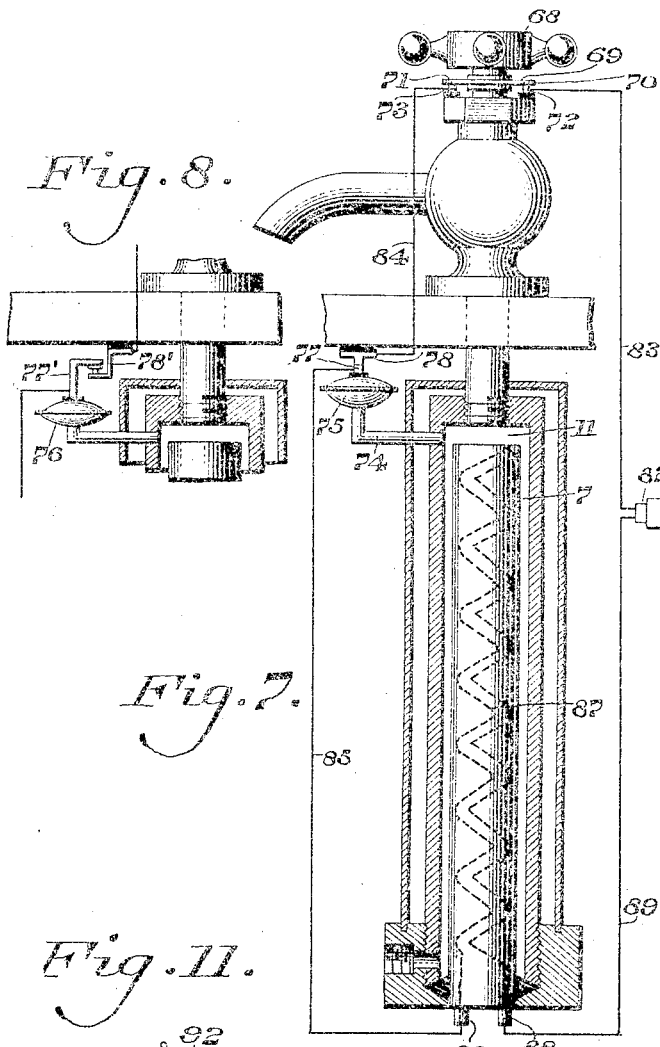
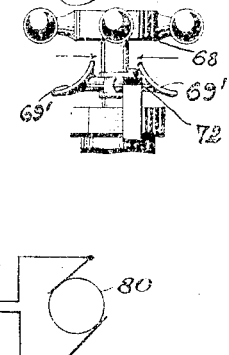
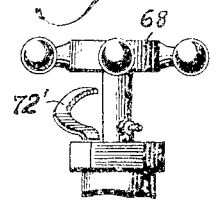
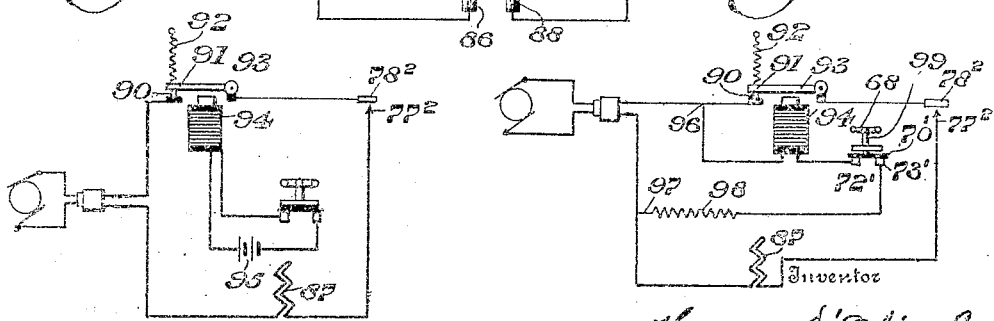
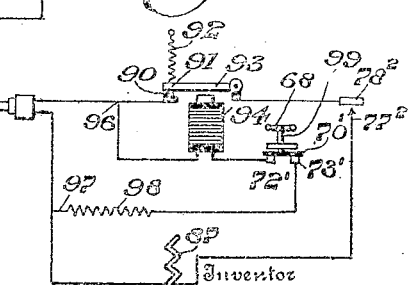

UNITED STATES PATENT OFFICE.

HENRY D'OLIER, JR., OF PHILADELPHIA, PENNSYLVANIA, ASSIGNOR OF ONE-HALF TO GEORGE W. ELKINS, OF ELKINS PARK, PENNSYLVANIA.

ELECTRIC HEATER.

No. 877,177.   Specification of Letters Patent.   Patented Jan. 21, 1908.

Application filed January 13, 1906. Serial No. 295,921.

*To all whom it may concern:*

Be it known that I, HENRY D'OLIER, Jr., a citizen of the United States, residing in the city and county of Philadelphia, State of Pennsylvania, have invented a new and useful Electric Heater, of which the following is a specification.

The purpose of my invention is to provide a novel construction and arrangement of electric water heating units.

A further object of my invention is to provide ready operation of the same in either series or parallel.

A further object of my invention is to bring the character of operation, whether series or parallel, within the control of the local operator.

A further object of my invention is to provide for thermostatic control of an electric heater.

A further object of my invention is to provide for coincident application of water and electricity to an electric water heater.

A further object of my invention is to restrict the temperature of my electric heater.

A further object of my invention is to provide for complete circulation of the water about the heating elements.

A further object of my invention is to provide interchangeable standard units with a complete series-multiple control.

A further object of my invention is to provide for the application of a standard diaphragm thermostat for the protection of an electric water heater against excessive temperature and pressures.

A further object of my invention is to provide for the automatic control of the water and electricity in an electric water heater.

Figure 1 represents standard electric heating units with series-multiple control. Fig. 2 represents a modified form of heater. Fig. 3 represents a further modification applied to a heater. Fig. 4 represents a form of switch suitable for use in connection with my heater. Fig. 5 represents a modified form of current control by water flow. Fig. 6 represents a further modification in the form of heater which may be used. Fig. 7 represents an electric heating device partly in elevation and partly in section with diagrammatic wiring. Fig. 8 represents a detail of a portion of Fig. 7. Figs. 9 and 10 represent elevations of modifications of details of portions of Fig. 7. Figs. 11 and 12 represent diagrammatic views of modifications.

Similar numerals of reference indicate corresponding parts in the figures.

Referring to the drawings. 1 designates the base within which I place, as in the form shown in Fig. 1, electric heating units 2 and 3, each consisting of a preferably central electric heater 4 capable of attaining a high temperature, surrounding the heater 4 by preferably concentric shells 5 and 6 providing spaces 7 and 8 between the shells. The inner space 7 is in each case in connection with a passage way 9 by which water may be introduced to the space from below or out of which water may be withdrawn when introduced from above. The outer passage 8 is filled with air or other non-heat-conducting material affording a means by which the temperature of the outer shell 6 is kept moderate, notwithstanding the relatively high temperature of the inner shell, the heat element and the water contained. Through the top of the shell 6 in each case I pass a pipe 10 by which connection is formed with a space 11 within the upper part of the shell 5 and in connection with the passage-way 7. This pipe 10 is in each case connected to a pipe 12 and 12' through which water may be introduced or withdrawn from the elements. Between the elements and within the base I provide an aperture 13 by which water may be introduced through the pipe 14 or in any other suitable manner or through which water may be withdrawn if desired. Within the pipe 12 I provide valves 15, 16 and 17 and within the pipe 14 I provide a valve 18 by which the flow of water through these several pipes may be controlled.

I supply electric current to the heating elements 4 by means of plugs 19 and 20 which are electrically connected to any source of current in any suitable manner and I have shown these plugs as connected in parallel. It will be evident that these connections may be made in series or that control of the series or parallel or series-parallel arrangement of these heating elements may be determined by outside switches if desired.

While the elements shown consist of but two, arranged for permanent connection to water pipes 12, 12' and 14, it will be evident that more than two elements can be used and that they may be arranged altogether in series, altogether in parallel or in groups of series parallel as desired and that this arrangement may be permanent or that it may be within control by suitable valves within the several pipes. The elements themselves may be portable and the constructions temporary.

In the form shown in Fig. 1 in which but two standard units are connected, it will be evident that the water may be drawn through the pipe 12, downwardly through the element 3, upwardly through the element 2 and out through the pipe 12' making a complete series arrangement of the two units, the valves 15 and 17 being opened and the valves 16 and 18 being closed. It will be evident also that the valve 15 may be closed and the valves 16, 17 and 18 may be opened, in which case the flow of current will be through the pipe 14 upwardly through both of the units 2 and 3, in multiple and outwardly from both units through pipe 12'. This arrangement contemplates the connection of both pipes 12 and 14 to cold water supply pipes and the withdrawal of the hot water in either case through the pipe 12' and any suitable faucet. It will be evident that this pipe may be connected to either a hot or cold water faucet with proper valve control and that the flow of water in that case may be through a single heating unit 3 and pipe 14 to the hot water faucet.

In the drawings I have shown the shell 5 apertured at 21 to permit free admission of water from the passage 9. It will be evident that this shell may be terminated at 22 and a separate shell be used for the lower part 23 of the same or that this lower portion 23 may be omitted or be an integral part of the frame. As shown in Fig. 1, the portion 23 of this shell performs the function of pressing the gasket 24 in place and that this gasket may be composed of any elastic or other suitable material for packing purposes. In place of either of the units 3 and 4 I may use a different type of heating unit such as shown in Figs. 2, 3 or 6 or any other suitable type of heating unit.

In the type shown in Fig. 2, I have illustrated a single heating unit adapted for fixed attachment upon any suitable stand or basin. In this form I have provided a base 25 in connection with the cold water supply pipes and having an outlet tube or faucet pipe 26 controlled by valve 27 and handle 28. This valve may be of any desired type permitting access of water under pressure at all times to valve 28' or the valve 27 may be of a conventional type and the water may have access to valve 28' through a separate pipe. The handle 29 controls this valve 28' by means of spindle 30 upon the opposite end of which is placed a wedge-shaped lever 31, shown in open position and the path of movement is such that at the same time water is permitted to the passage 32, this valve presses spring contact 33 against contact 34 closing an electric circuit at this point. The water flowing in the passage 32 in the direction of the arrows passes upwardly upon the outside of the coil 35 of the electric heater 36. The outlet for this water is through pipe 37 and flared at its lower end at 38 to reduce the friction from cross currents. The flow of the currents upwardly through the coil is prevented by baffle plate 39 which necessitates the water current coming in contact with both the outside and inside of the coil 35 of the heater 36. This insures a maximum of contact of the water with the elements of the heater. The current is supplied for the electric heater by means of wires 40 and 41, the current passing completely through the coil in both directions thus passing in at the end 42, traversing the entire length of the coil, reversing in direction at the end of the coil and traversing the entire length of the coil in the opposite direction to its exit point at the end 42. In the illustration the nozzles 26 and 43 are shown at right angles to each other for convenience of illustration. It is evidently not essential that this be the case, the nozzle 43 being permissibly and perhaps preferably above and almost in line with the nozzle 26. The outer shell 44 and cap 45 of this heater are protected by an additional shell and air or other heat insulating means such as are shown at 6 and 8, in Fig. 1. Contacts 33 and 34 may be insulated in any desired manner normally from each other and always from the other parts or fittings of my faucet heater by insulation 46. I have shown a baffle plate 39 mounted upon standards 47 and have shown shell 44 supported by the water connecting pipe 48. Either of these may be additionally or differently supported. I have shown nozzle 43 and the tubing 49 of the coil 35 packed in any suitable manner at 50. It will be evident that any method of tightening this point may be used. The cap 45 is shown as separate from the shell 44. This separability may be accomplished as shown by friction or any other suitable manner permitting the removal of the cap.

The form shown in Fig. 3 differs from the form shown in Fig. 2 in that it is intended for temporary connection. It also differs in the form of valve and in the means of making electric contact. I have illustrated a gate valve 51 opening by downward pressure of rod 52 by thumb press 53, operating against the action of spring 54. This rod carries a contact 55 which is in electric connection with one lead wire 56 from the source of electricity. The other lead wire 57 is directly connected to the coil 35 of my heater 36, passes down through this coil, reverses and returns and at or near its point of emergence from the coil is connected to the contact 58. The contacts 55 and 58 are insulated as at 59. The contact 55 is attached to the rod 52 and forms electric connection, completing the circuit of the electric current through contacts 55 and 58.

The switch shown in Fig. 4 is intended as a conventional illustration of one form of switch which is suitable for use to make electric contact at the same time that the water current is started. In this form of switch the bracket 60 is arranged in proximity to the spindle 61 of the valve 62 in the pipes 63, which lead to the heater. The electric circuit is normally interrupted between the contacts 64 and 65. The contact piece 66 carried by the spindle 61 and insulated therethrough at 67 makes contact between the plates, strips or springs 64 and 65 when the water valve is opened.

Fig. 6 illustrates in section, a form of casing, outer cover and interior heat element which may be used, providing a spiral path for the travel of the water between the casing and heat element.

In the form shown in Fig. 7, I have shown two points of possible interruption of the circuit, one corresponding to the point of interruption previously described by which the current is thrown on when the valve is opened and the other, automatic, in which contact or lack of contact is dependent upon the temperature of the heat element and adjoining space. This is my thermostatic control and is accomplished by the insertion of a standard diaphragm thermostat whose diaphragm is in connection with the space 7 and which carries a contact normally touching a contact upon the frame of the stand or other fixed point to secure continuity of electric circuit, but automatically withdrawn from this connection with excessive temperature (or perhaps in some instances pressure). I have shown this thermostat in Figs. 7 and 8 as operating to break circuit under different conditions, in Fig. 7 by downward movement and in Fig. 8 by upward movement of the diaphragms. In these forms I provide the valve handle 68 having thereon and insulated therefrom a contact plate 69 having two ears 70 and 71 in such position that these ears touch the contacts 72 and 73 when the valve is open to allow passage of the water. The extent of movement of the plate necessary to make and permitting the retention of this contact can be controlled readily by the angular position and extent of these ears or of the contact 72 and 73. It will evidently be necessary to have contact made before a very great supply of water has been permitted to pass through the valve and to have this contact maintained from this point, preferably to and until the valve is completely opened.

It will be evident that contact of the ears with the points 72 and 73 may be maintained by using a valve of such character that there is no longitudinal travel of the stem carrying this plate 69 with movement of the valve or by distributing the contacts 72 and 73 spirally along the track as at 72', Fig. 10 so that contact is maintained throughout the spiral movement of the plate 69. This plate may evidently also be itself formed in a spiral as at 69', Fig. 9 making contact with point 72.

In connection with the passage 7 or the space 11 and preferably well above the center of the passage 7, I place a pipe or passage 74 which is connected to a standard diaphragm thermostat of either of the types 75 or 76 which by movement in a downward direction in the case of 75 and in an upward direction in the case of 76, separates two electric contacts 77 and 78 in the form shown in Fig. 7, 77' and 78' in the form shown in Fig. 8. These contacts are normally together completing an electric circuit at this point which may be briefly traced as follows referring to Fig. 7. From the dynamo or other source of power 80 through a socket 81 to the plug 82 by which the particular connection desired may be temporarily obtained or through the direct house wiring current is supplied to conductor 83, thence to contact 72, through plate 69, when the valve is turned on to contact 73, thence by conductor 84 to and through contact 77 and 78 by conductor 85 to one terminal 86 of the heater 4 through the coil 87 of said heater and the other terminal 88 by means of conductor 89 to the other side of the plug 82 or of the house wiring.

The two points of possible interruption already noted are at the standard diaphragm thermostat and the valve handle. As is well known by the operation of the thermostat mentioned it can be set to operate at any desired temperature or can be regulated when in place for a suitable temperature. In consequence, if there be a rise of temperature in the passage 7 for any reason beyond the desired point usually about about two hundred degrees the electric circuit will be broken and the current will be turned off. It will be operated by hot air, water or steam and will therefore operate whether there be any stoppage in the supply or in complete supply of water to the heater or not.

The switch controlled by the valve handle 68 may apply the current to the circuit directly as indicated in Fig. 7 or indirectly as indicated in Figs. 11 and 12. In these figures the point of thermostatic control of current is indicated at $77^2$, $78^2$, the heaters by their coils 87 and the points of actual valve control of the current 90 and 91. These points of contact are in the form of a switch normally spring-controlled at 92 to remain in open position but whose levers 93 form armatures for an electro-magnet 94. The current for the electro-magnet is supplied in the form shown in Fig. 11 by a battery 95 indicative of any independent source of current supply and in the form shown in Fig. 12 by a shunt from the main heating current tapped therefrom at 96 and 97 and reduced within desirable current quantities by the resistance of electro-magnet and if required, a resistance 98. Each of the electro-magnetic circuits shown is normally open at point 72′, 73′ and is closed at these points when the water is turned on by means of strip 70′ attached to spindle 99 upon which is mounted the valve handle 68. It will thus be seen that in each of these forms it is possible to control a current of any desirable strength for heating purposes with entire safety independently of the possible accidental completion of the circuit at the handle contacts because it is possible to use currents of extremely low potential, and small amperage for all that portion of the circuit which lies within the range of possible accidental interference.

In the form shown in Fig. 5 I have illustrated another form of automatic contact formation. In this form two contact strips 100 and 101 are insulated at 102 and are within a path of movement of one end 103 of a lever 104, the other end 105 is within the path of movement of the water. This valve operates through an aperture 106 which is kept closed against escape of the water by any suitable gasket or valve closure such as is illustrated at 107. The exact form of closure which is used at this point does not comprise a part of my invention.

I am aware of an application filed by George Elkins of even date herewith, showing and describing some of the same constructions herein illustrated.

Having thus described my invention, what I claim as new and desire to secure by Letters Patent, is:—

1. In a device of the character described, a plurality of water heating units each having a heat element and connections forming a passage thereabout with means for connecting the water passages of said units in series or in parallel at will and means for causing a flow of electric current through said heat element.

2. In a device of the character described, an electric water heater, having a passage therethrough, a thermostat in fluid connection with said passage and an electric circuit feeding the heating element of said heater and having points of contact within control of said thermostat.

3. In a device of the character described, an electric heater, an electric circuit controlling said heater, a point of interruption in said circuit within temperature control from said heater and a further point of interruption in said circuit within automatic control of the passage or non-passage of water through said heater.

4. In a device of the character described, an electric water heater, an electric circuit controlling the flow of electricity to said heater, a valve controlling the flow of water thereto, contacts in said circuit within control of a standard diaphragm thermostat connected to the water passage of said heater and points of contact in said electric circuit within control of the said water valve.

5. In a device of the character described, a casing, an electric heater within said casing in the form of a shell therein, a baffle plate closing the end of said shell, inlet and outlet water connections for said heater upon opposite sides of said baffle plate and in proximity thereto and means for automatically causing the current to flow through the heating element when water is allowed to pass through the heater.

6. In a device of the character described, a water heater, a casing and a heating element in the form of a shell, a baffle plate closing one end of the shell, water connections causing water to flow around the shell upon both sides thereof and means causing an electric current to flow through said heating element.

7. In a device of the character described, a casing, an electric heater within said casing in the form of a shell therein, a baffle plate closing the end of the shell, means for passing water from one side of said baffle plate to the opposite side thereof, and means for causing a current of electricity to flow through the heating elements concurrently therewith.

8. In a device of the character described, a casing, a heat element therein forming a shell closed at one end, means for admitting and withdrawing water upon opposite sides of the closed end, and means for causing electricity to flow through the heating element when water is admitted and withdrawn.

9. In a device of the character described, a casing, a heat element therein in the form of a shell closed at one end, inlet and outlet passages for water, one of which is within the shell, and means for causing a current of electricity to flow through the heating element.

HENRY D'OLIER, JR.

Witnesses:
WM. CANER WIEDERSEIM,
C. D. MCVAY.